US012169760B2

(12) United States Patent
Aeppli et al.

(10) Patent No.: US 12,169,760 B2
(45) Date of Patent: Dec. 17, 2024

(54) UNIVERSAL QUANTUM COMPUTING USING ELECTRO-NUCLEAR WAVEFUNCTIONS OF RARE-EARTH IONS

(71) Applicant: Paul Scherrer Institut, Villigen (CH)

(72) Inventors: Gabriel Aeppli, Zürich (CH); Markus Müller, Arlesheim (CH); Manuel Grimm, Pratteln (CH); Adrian Beckert, Othmarsingen (CH)

(73) Assignee: Paul Scherrer Institut, Villigen (CH)

( * ) Notice: Subject to any disclaimer, the term of this patent is extended or adjusted under 35 U.S.C. 154(b) by 122 days.

(21) Appl. No.: 18/041,575

(22) PCT Filed: Jul. 29, 2021

(86) PCT No.: PCT/EP2021/071242
§ 371 (c)(1),
(2) Date: Feb. 14, 2023

(87) PCT Pub. No.: WO2022/033881
PCT Pub. Date: Feb. 17, 2022

(65) Prior Publication Data
US 2023/0297870 A1    Sep. 21, 2023

(30) Foreign Application Priority Data

Aug. 14, 2020 (EP) .................................... 20191158

(51) Int. Cl.
*G06N 10/40* (2022.01)
(52) U.S. Cl.
CPC .................................. *G06N 10/40* (2022.01)
(58) Field of Classification Search
CPC .................................................... G06N 10/40
See application file for complete search history.

(56) References Cited

U.S. PATENT DOCUMENTS

| 7,492,494 B2* | 2/2009 | Goto | B82Y 10/00 |
| | | | 359/107 |
| 11,438,076 B2* | 9/2022 | Faraon | H04B 10/70 |
| 2022/0129778 A1* | 4/2022 | Duan | G06N 10/20 |

FOREIGN PATENT DOCUMENTS

EP    1310910 A1    5/2003

OTHER PUBLICATIONS

C. D. Hill et al., "A surface code quantum computer in silicon", Science Advances, vol. 1, No. 9, Oct. 30, 2015 (Oct. 30, 2015), p. 1-11, XP055332013.

(Continued)

*Primary Examiner* — Gregory H Curran
(74) *Attorney, Agent, or Firm* — Laurence A. Greenberg; Werner H. Stemer; Ralph E. Locher

(57) ABSTRACT

A universal quantum computing system uses electro-nuclear wavefunctions of rare-earth ions embedded in an insulating solid state matrix. Each rare-earth ion represents a nuclear qubit that can be selectively operated as a passive or active qubit. The passive qubit is a passive electronic doublet at a non-degenerate ground state that stores the quantum information in the two different nuclear spin states possible in the non-degenerate ground state causing two different passive-state electro-nuclear wavefunctions. The active qubit is an active electronic doublet at a non-degenerate excited state that stores the quantum information in the two different nuclear spin states possible in the non-degenerate excited state. A laser source generates laser pulses to optically excite the rare-earth ions from the non-degenerate ground state into the non-degenerate excited state and vice versa, to locally control the electronic dipolar interaction in a tunable manner among at least two active qubits.

3 Claims, 6 Drawing Sheets

(56) References Cited

OTHER PUBLICATIONS

Ahlefeldt R L et al, "Quantum processing with ensembles of rare earth ions in a stoichiometric crystal", arxiv.org, Cornell University Library, 201 Olin Library Cornell University Ithaca, NY 14853, Dec. 16, 2019 (Dec. 16, 2019), XP081559404, Sections II-IV, Figure 1.

* cited by examiner

UNIVERSAL QUANTUM COMPUTING USING ELECTRO-NUCLEAR WAVEFUNCTIONS OF RARE-EARTH IONS

FIELD AND BACKGROUND OF THE INVENTION

The present invention relates to a quantum computing device using wavefunctions of rare-earth ions.

RE Life and Coherence Times

Rare-earth (RE) ions embedded in an insulating solid-state matrix provide an interesting platform for quantum computing and quantum information processing. The nuclear spins and the electronic crystal field (CF) levels of RE ions can be used to store and manipulate quantum states. Due to the long decoherence times of the quantum states of RE ions, they are well-suited for the implementation of qubits. Dephasing times ranging from 100 µs for electronic transitions between CF states, to 1.3 s for nuclear transitions and even up to six hours by employing dynamical decoupling have been recently demonstrated.

Readout and Coupling

Furthermore, the possibility to read out single spin states has been demonstrated using detection of photons emitted from yttrium aluminum garnet (YAG), yttrium orthovanadate (YVO) and yttrium orthosilicate (YSO), which makes such RE systems promising platforms for quantum technology. Some RE ions exhibit CF transitions in the frequency range used in telecommunications, which makes them well-suited as quantum repeaters.

Earlier Proposals

Previous schemes for quantum computing with RE ions proposed to use electric dipolar interactions of CF states, suggesting to realize a CNOT gate via an indirect dipole blockade effect. In that scheme, the dipole field from the control qubit may shift the transition frequencies of the target qubit. This is used to implement a CNOT gate with a sequence of pulses, which is effective only if the control bit is in the logical 1-state.

SUMMARY OF THE INVENTION

It is therefore the objective to provide an universal quantum computing system that allows for fast and secure processing of the stored binary coded information.

This objective is achieved according to the present invention by an universal quantum computing system using electro-nuclear wavefunctions of rare-earth ions, comprising:
a) a 2d-matrix of rare-earth ions being embedded in an insulating solid state matrix, wherein:
b) each rare-earth ion representing a nuclear qubit that can be selectively operated as a passive qubit or as an active qubit;
c) said passive qubit being represented by a passive electronic doublet at a non-degenerate ground state thereby storing the quantum information in the two different nuclear pin states possible in this non-degenerate ground state causing two different passive-state electro-nuclear wavefunctions, and
d) said active qubit being represented by an active electronic doublet at a non-degenerate excited state thereby storing the quantum information in the two different nuclear pin states possible in this non-degenerate excited state causing to different active-state electro-nuclear wavefunctions, and
e) a laser source for selectively generating laser pulses in order to optically excite the rare-earth ions from the non-degenerated ground state into the non-degenerate excited state and vice versa, thereby locally controlling the electronic dipolar interaction in a tunable manner among at least two active qubits, and
f) an external electrical field in form of switchable electric gates for inducing a Stark shift for a selectable qubit, and
g) an external magnetic field.

Using the above ingredients, it is possible to implement a qubit logic, such as a CNOT gate, using the Ising-like dipole interaction between two active qubits. This achieves a speed-up by up to two orders of magnitude as compared to standard dipole blockade systems. A decisive advantage of the inventive scheme as compared to many others lies in the fact that the selective activation and the slow power law decay of the dipole interaction allows gates between relatively distant qubits, even if many non-activated qubits are located between the two qubits that are being coupled. In contrast to similar schemes which also use nuclear spins as passive qubits, one can reach a speed-up for single-qubit gates by a factor of order 600. This is achieved by coupling to electronic instead of nuclear matrix elements which is possible due to different g-factors in the ground state and the excited doublets. Furthermore, the use of the effective spin of a RE shell (as opposed to spins of single electrons as in phosphorous doped silicon) allows for larger magnetic moments of several PE. At equal distances of qubits, the dipolar interaction is enhanced by the square of the larger magnetic moment and the two-qubit gate time is accordingly reduced by an order of magnitude. Thus, the present invention discloses the implementation of RE qubits with coupled electro-nuclear degrees of freedom and fast single-qubit and CNOT gates that can entangle not only nearest neighbors, but also relatively distant qubits in an array. Combined with the readout capability of single ions and the possibility of coupling RE ions to optical modes, networks of such ions are appropriate for scalable quantum computing systems.

A preferred embodiment of the present invention can be achieved when the 2d-matrix is realized by growing a single layer containing dilute magnetic RE ions on top of a bulk material that contains no RE qubits and covering this layer with a thin layer of magnetically inert bulk material or alternatively by the single ion implantation of the RE ions in bulk silicon.

A preferred embodiment with detailed feasibility can be achieved when the 2d-matrix is a $LiYF_4$ bulk material being doped with $^{167}Er^{3+}$ ions.

Preferred embodiments of the present invention are described hereinafter in more detail with reference to the attached drawings which depict in:

DETAILED DESCRIPTION OF THE INVENTION

The present invention discloses a faster two-qubit gate based on the magnetic dipole interaction, which is inspired by two-qubit gates implemented using phosphorus donors in silicon and is similar to hybrid electron and nuclear spin schemes in nitrogen vacancy centers in diamond.

Figure 1:
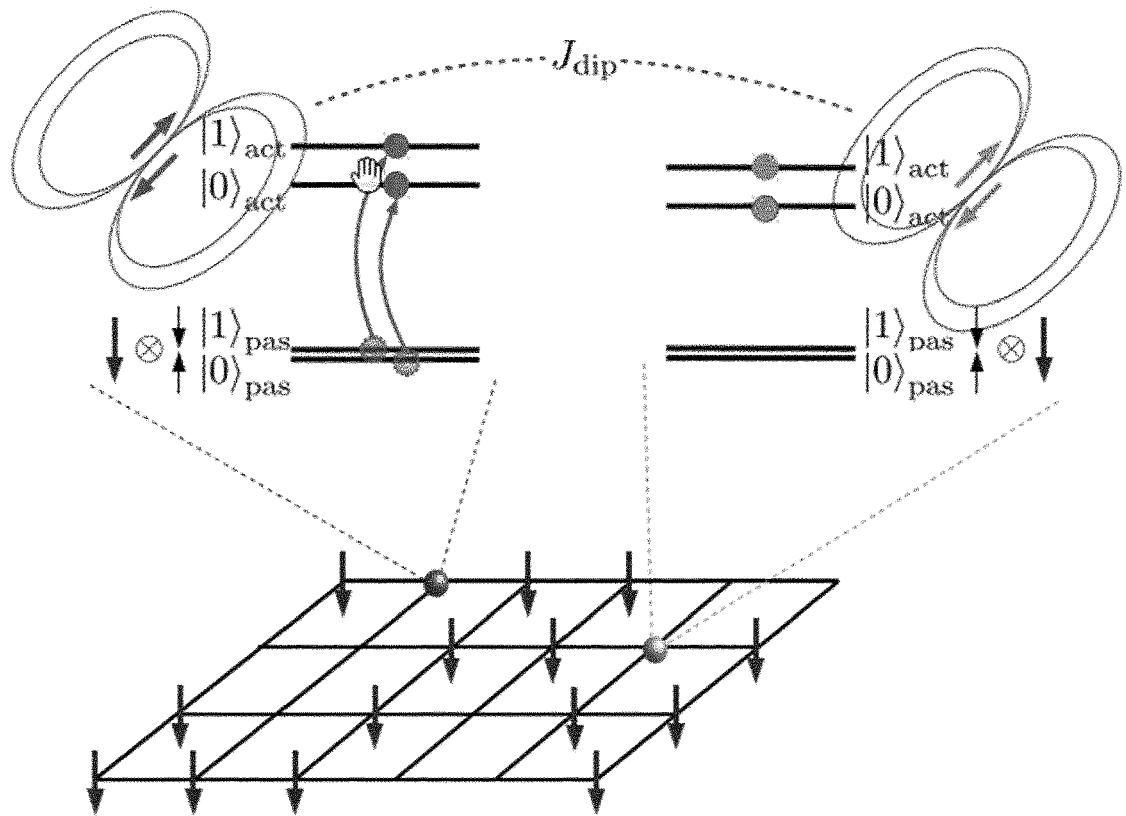
FIG. 1 Basic principle of the quantum computing scheme.
Figure 2:
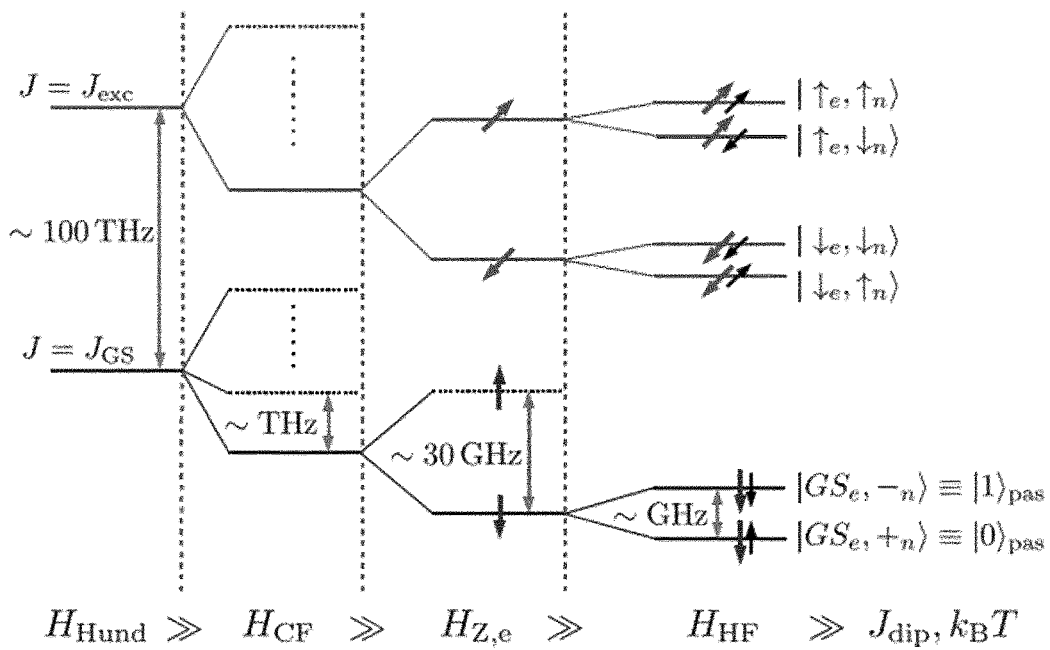
FIG. 2 Level scheme of a RE ion showing the energy scales governing the Hamiltonian.
Figure 5:
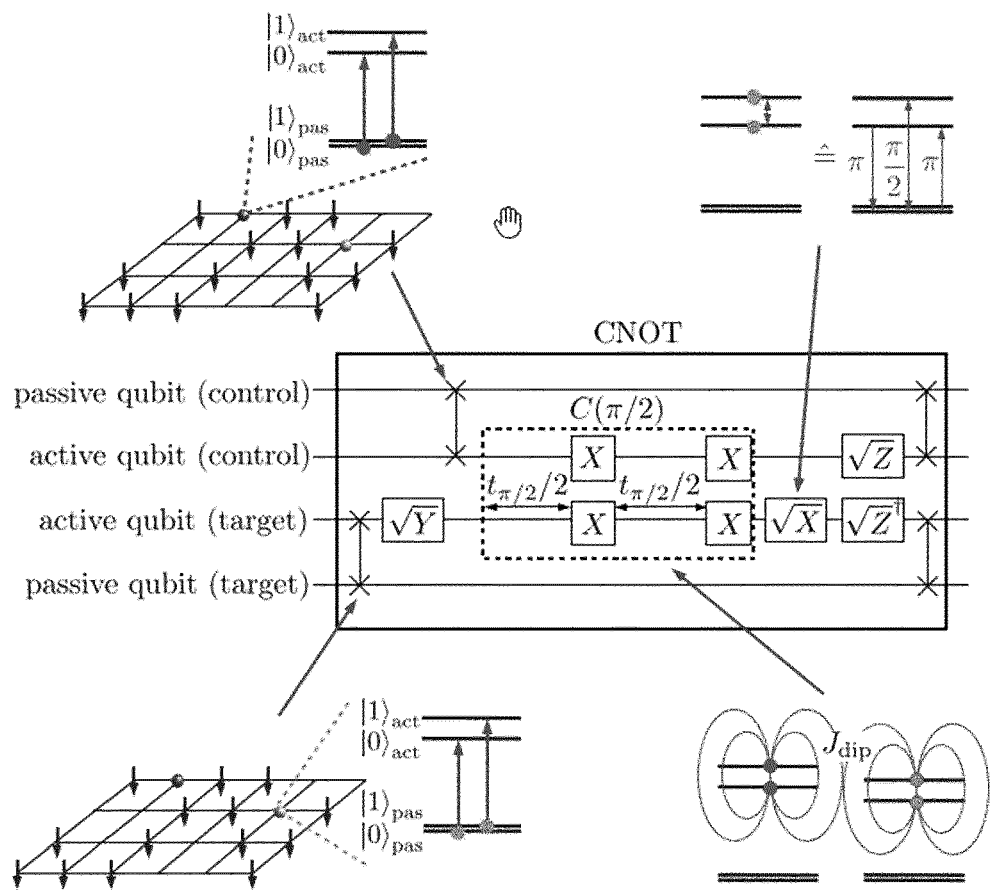
FIG. 5 Circuit diagram of the fast implementation of the CNOT gate for two RE qubits.

The basic principle of the present invention is shown in FIG. 1 and the underpinning hierarchy of relevant energy scales in FIG. 2, while the full scheme is illustrated in FIG. 5. In the present invention, the quantum information is stored in nuclear spin states in the presence of a non-degenerate electronic ground state. Those are ideal as quantum memories due to their weak interactions with the environment. To implement single-qubit and two-qubit gates, hyperfine interactions and optical pulses are exploited to transfer the wavefunctions of the nuclear spins to 'active qubits' consisting of excited electronic doublet states that carry a large magnetic moment. Two such active qubits interact at relatively long distances via magnetic dipolar interactions. By making use of the non-trivial unitary evolution of the active qubits under this Hamiltonian, the full interaction strength can be exploited to execute the gate. This reduces the gate time by up to two orders of magnitude as compared to the dipole blockade scheme.

FIG. 1 shows the basic principle of the quantum computing scheme. The passive (memory) qubit consists of nuclear degrees of freedom in the presence of polarized electronic RE spins. Their strong hyperfine coupling allows for rapid single qubit operations. Even though the electronic spins create substantial internal fields, they are essentially static and much smaller than the hyperfine splitting, and thus do not dephase. The nuclear qubits can be selectively activated by optical excitation to a (locally tunable) electronic CF doublet with a large magnetic moment. Two activated qubits communicate via the electronic dipolar interaction, allowing for fast two-qubit gates over distances as large as 10 nm. On the other hand, their entanglement with the qubits that remain passive is stable up to timescales far in excess of the gate operation time because the magnetic dipole interaction between electrons is much less than the chosen Zeeman energy polarizing the electrons. This also implies that the entanglement among the qubits "left behind" by the selective optical excitation remains unaffected The present invention differs significantly from proposals based on exchange coupled donors, for example in silicon. Those entangle spins indirectly via an effective interaction mediated by an electronic wavefunction. The radius of this wavefunction is manipulated optically or with electrical gates and tunes the hyperfine interaction strength between nuclei and electrons. Thereby the effective interaction between qubits is switched on and off. The present scheme instead entangles nuclear spins by use of the dipolar interaction between electron spins. The latter offers great freedom in choosing the pairs of qubits to be entangled—in contrast to the spatial constraints inherent to schemes where the qubit interaction is due to controlling the spatial extent of electronic wavefunctions and their overlaps.

It is noted that the present quantum computing scheme shares several similarities with the ones for phosphorous donors in silicon. Similarly, presently one uses nuclear spins as passive qubits, dipole-coupled active qubits and essentially the same CNOT implementation. However, the present scheme features several additional advantages which we will discuss in Sec. "Comparison to implementation with phosphorous donors in silicon".

The present disclosure is organized as follows: In Sec. "Set-up and Hamiltonian" a quantum computing scheme is explained based on a RE system and necessary and desirable properties of its crystal field levels are discussed. It is described how to carry out fast single-qubit gates in Sec. "Single-qubit gates". In Sec. "Two-qubit operations" the implementation of a CNOT gate via magnetic dipolar interactions is implemented. The DiVinvenzo criteria for quantum computing, and in particular the stability of qubits which are not directly addressed in specific one- and two-qubit operations, are considered in Sec. "DiVincenzo criteria and addressability of single qubits". The present scheme is compared to the CNOT implementation via the dipole blockade in Sec. "Comparison to similar schemes". Further, experimental considerations are discussed in Sec. "Discussion" and a case study of erbium-doped LiYF4 is presented. Finally, the main results are presented in Sec. "Conclusion".

Set-Up and Hamiltonian

Single-Ion Hamiltonian

To realize qubits, it is made use of the hyperfine states of single RE ions in a solid-state matrix. The effect of the crystal environment on the RE ions is captured by the CF potential, the essentials of which is review in Appendix "Single-ion Hamiltonian". This potential breaks the spherical symmetry of the isolated ion and splits its (2J+1)-fold degenerate J-manifold into crystal field levels, whose degeneracy and magnetic properties depend on the point symmetry of the RE site in the crystal. The splitting between different J-manifolds is governed by Hund's rules and is typically very large, $\Delta_J/h \sim 100$ THz. Within a given J-manifold the single-ion Hamiltonian consists of the CF potential $H_{CF}$, Zeeman terms ($H_{Z,e}+H_{Z,n}$) (in the presence of an external magnetic field B) and the hyperfine interaction $H_{HF}$ between the electronic spin, vec{J}, and the nuclear spin, vec{I}, $$H_{single}(\vec{J}, \vec{I}) = H_{CF} + H_{Z,e} + H_{Z,n} + H_{HF} \quad (1)$$
$$= V_{CF}(\vec{J}) + g_J \mu_B \vec{B} \cdot \vec{J} - g_N \mu_N \vec{B} \cdot \vec{I} + A_J \vec{J} \cdot \vec{I}$$

FIG. 2 illustrates the hierarchy of the terms in the Hamiltonian. The CF potential $V_{CF}(vec\{J\})$ induces the largest splitting within a given J-manifold, typically of the order of hundreds of GHz up to several THz. The electronic Zeeman term with the Landé factor $g_J$ lifts the degeneracy of time-reversal-symmetry protected doublets. It induces a splitting linear in the field, of the order of ~2 $\mu_B/h \approx 30$ GHz/T. These two terms determine the electronic level structure, which will be used to coherently manipulate the electronic wavefunctions of the RE ions.

The hyperfine interactions with the nuclear spin I are usually well captured by a contact interaction of the form vec{J}*vec{I} with the hyperfine constant $A_J$. This interaction can be used to entangle the electronic and nuclear wavefunctions, or to transfer quantum information from nuclear to electronic degrees of freedom, and back. The hyperfine splitting of magnetic CF states (in a manifold with non-zero vec{J} and vec{L} is typically of the order of $A_J/h \sim$ GHz. In this document the nuclear spin is assumed to be I=1/2, but similar reasonings and results apply to larger nuclear spins.

The last relevant energy scale is the dipole interaction between RE ions. In the following, it is always assumed to be much smaller than the hyperfine splitting. Due to the tiny nuclear moment $\mu_N$, much smaller still are the nuclear Zeeman term and the internuclear dipolar interactions. For our scheme the former only plays an indirect role, insofar as it increases the fidelity of our two-qubit gate by tuning out of resonance a class of undesired higher-order spin-flip processes that could occur while carrying out the gate operation.

FIG. 2 shows a level scheme of a RE ion showing the energy scales governing the Hamiltonian. The CF level structure shown is optimal for our proposed scheme. Hund's coupling splits the electronic structure into different multiplets of total angular momentum J. The ground state and one excited manifold is used, requiring the lowest lying states of both manifolds to be CF doublets, which then Zeeman-split by an external field. From the ground state doublet only the lower Zeeman state is needed. The coupling to a nuclear spin with I=1/2 splits the electronic states into pairs of hyperfine states, where the nuclear spins are either aligned or anti-aligned with the electronic spin. The spatial density of RE ions is adjusted such that the dipolar interactions $J_{dip}$ are by far the smallest energy scale (apart from the nuclear Zeeman energy), $J_{dip} \ll \Delta E_{HF}$. An analogous bound $\kappa_B T \ll \Delta E_{HF}$ applies to the operation temperature such that initialization to the ground state is possible. The notation of the states is explained in the main text.

Active and Passive Qubits

To achieve long coherence times, the quantum information is stored in the nuclear spin states on the RE ion, whose electronic state is in its ground state. These nuclear states serve as memory or 'passive' qubits. The passive qubit states is denoted as $|0\rangle_{pas}$ and $|1\rangle_{pas}$, respectively. Due to the small magnetic moments of the nuclear spins, they hardly interact with each other and their environment. Moreover, they couple to phonons only very weakly (indirectly via the electrons), so their coherence time is much bigger than that of electronic states.

The electronic ground state $|GS_e\rangle$ is required to be non-degenerate, otherwise the hyperfine interaction would entangle the nuclear degrees of freedom with those of the electronic ground state, which in turn would mediate magnetic dipolar interactions with other RE ions. This constraint can be satisfied either by RE ions with a singlet CF ground state, or by using RE ions with a magnetic doublet ground state, to which a sufficiently strong external field is applied, such that the Zeeman splitting is much bigger than the hyperfine interaction. In the latter case the polarized electronic ground state exerts a constant field on the nuclear spins, which results in a trivial phase evolution in the nuclear spin qubit, which can be easily accounted for. This second option turns out to be preferable, since it allows for faster single-qubit gates.

It is noted that this simple picture of a trivial phase evolution neglects resonant excitation hopping between RE ions, i.e. the hopping of the $|1\rangle_{pas}$ state due to virtual transitions involving excited states. To suppress the hopping, it is favorable to choose the ground state doublet with vanishing perpendicular g-factor. This forbids virtual transitions via the ('low energy') second Zeeman-split ground state, allowing only for transitions via the ('high energy') excited CF states. Then the effective hopping interaction scales as $$\sim J_{dip}\left(\frac{A_J}{\Delta_{CF}}\right)^2,$$

where $\Delta_{CF}$ is the gap to the admixed CF state and $J_{dip}$ is the dipole interaction between qubits. Since the present two-qubit gate time scales as the inverse of the dipolar interaction, this allows of the order of $$\left(\frac{\Delta_{CF}}{A_J}\right)^2 \sim 10^6$$

two-qubit operations during the (dipolar interaction limited) lifetime of the passive qubits. This is merely a lower bound on the number of two-qubit gates, since the hopping can be further suppressed by inhomogeneity among the RE sites, e.g. due to internal fields, strains or an externally applied field gradient. The required detuning between neighboring RE sites is of the order of the hopping energy, which amounts to about $\Delta \nu \sim 1$-10 Hz for a qubit spacing of r=10 nm, depending on whether or not the perpendicular g-factor vanishes in the ground state. It is further noted that the simple picture above also neglects the direct dipolar interaction between nuclear spins. This creates entanglement between them on a timescale corresponding to $\sim(\mu_B/\mu_N)^2 \sim 10^6$ two-qubit operations, which constitutes an intrinsic decoherence time of the present scheme. Depending on the exact values of the nuclear and magnetic moments, one can gain one more order of magnitude as electronic moments are usually several $\mu_B$.

Since the passive qubits are well protected (on the timescales discussed above), their quantum information needs to be transferred to 'active' qubits before one can implement efficient quantum gates on them. A natural candidate for an active qubit is a doublet of excited CF states, which is denoted $|\uparrow\rangle_e, |\downarrow\rangle_e$. In general, those have sizable magnetic moments of a few $\mu_B$, which allow them to interact with other active qubits through dipolar coupling. The interaction with the nuclear spin splits each of these CF states into a pair of hyperfine states, one of which needs to be selected to represent the active qubit. To limit decay processes, it is best to choose the qubit state $|0\rangle_{act}$ as the lowest of the four hyperfine states. This leaves two choices of how to assign the other qubit state $|1\rangle_{act}$ to either of the two hyperfine levels of the higher lying Zeeman state. Accordingly, it is distinguished between an electro-nuclear qubit and a purely electronic qubit, respectively, referring to the degrees of freedom in which the two qubit states differ, cf. FIG. 3.

The optimal assignment will be the one that maximally suppresses spin-flip errors in the implementation of a two-qubit gate. As it will be seen, in most cases the electro-nuclear qubit turns out to be the best choice, because the opposite orientation of the nuclear spin protects the electronic spins from flipping simultaneously.

Figure 3:
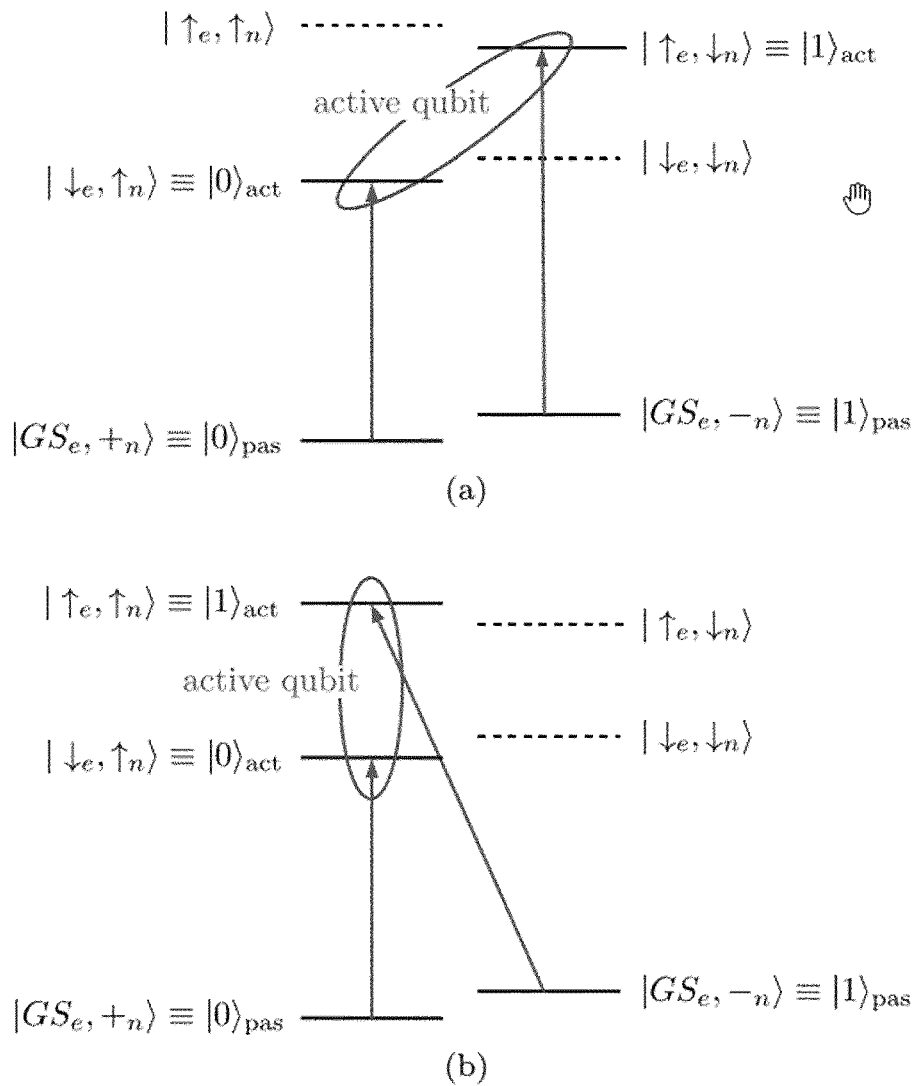
FIG. 3 two possible choices for the mapping between passive and active qubits.

To activate qubits (i.e., to transfer the quantum wavefunction from a nuclear spin to electronic degrees of freedom) one can use laser pulses that are resonant with specific transitions in the level scheme shown in FIG. 3. FIG. 3 shows two possible choices for the mapping between passive and active qubits: (a) electro-nuclear qubit and (b) purely electronic qubit. Activation of a qubit is achieved by two π-pulses as discussed in the main text. Each pulse leaves one hyperfine state of the passive qubit untouched and takes the other state into one of two target hyperfine states within the excited electronic doublet. Those two states constitute the active qubit. The two target states have opposite (electronic) magnetic moments, and thus the active qubits can interact over a long distance.

To maximize the lifetime of such an active qubit, the excited doublet should be the lowest CF level of an excited J-manifold, whose gap to lower J-manifolds is significantly bigger than the Debye frequency. Under those conditions the active qubit state can only decay via multi-phonon emission or via photon emission. For RE ions the photon emission rate is strongly suppressed, because the electric dipole operator only couples states with opposite parity. Since all $4f^n$-configurations of RE ions with a fixed number n of electrons in the 4f-shell have the same parity, the matrix elements for the optical decay are either due to small admixtures of highly excited states such as $4f^{n-1}4g$ and $4f^{n-1}5d$, or due to electric quadrupole moments. In either case the matrix elements of electromagnetic field operators are very small and accordingly the lifetimes of those doublet states will be long. Depending on the solid-state matrix, the rare-earth ion and the considered J-manifold, this can be more than 15 ms. Finally, the decoherence due to phonon emission is considered, i.e. due to the decay of the upper to the lower active qubit state. The associated rate is small due to the tiny Debye density of states at the frequency of the Zeeman splitting. Lifetimes from 130 ms to 60 s have been reported e.g. in Er-doped Y2SiO5. All the above considerations show that the active qubits should have long coherence times.

Proposal of an Ideal RE System

Figure 4:
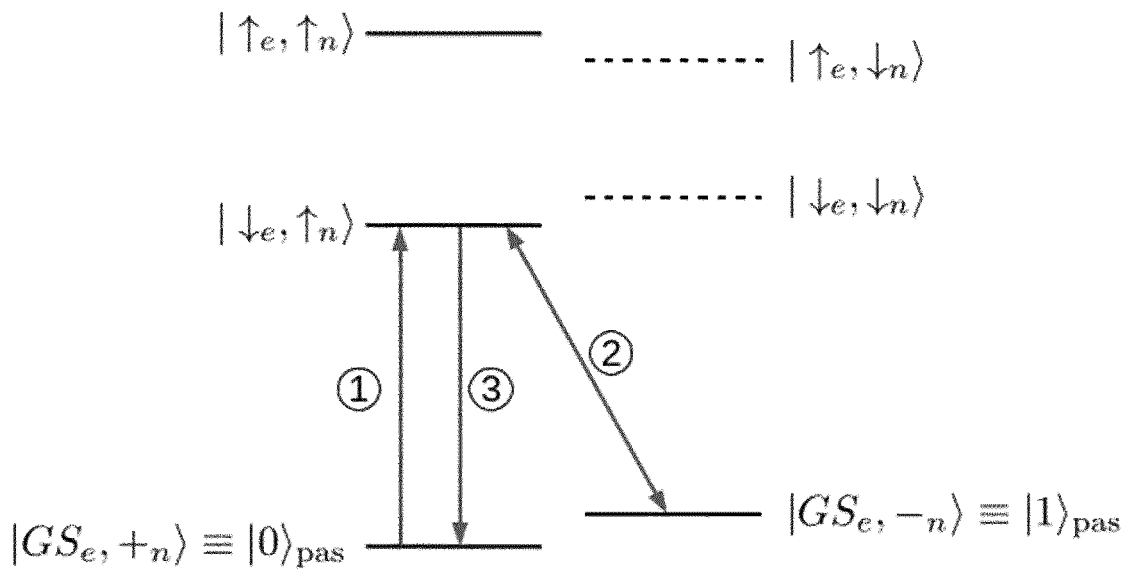
FIG. 4 Implementation of a fast X-gate via an excited state.

Here it is described what is considered to be the ideal system for quantum computing with RE ions. The desired CF level structure is shown in FIG. 4. The detailed reasons that single out this structure are developed in the next sections where single-qubit and two-qubit gate operations are described. In Sec. "DiVincenzo criteria" it is argued that the DiVincenzo criteria for quantum computing are met, and in Sec. "Addressability of selected qubits" and Sec. "passive qubit errors" the robustness of the states of qubits not targeted by particular single-and two-qubit operations is demonstrated.

As explained above, one requires the electronic ground state to be a doublet with a magnetic moment, which one then Zeeman-split to obtain a non-degenerate ground state. This polarized electronic ground state is hyperfine-coupled to the nuclear spin, whose ground state is anti-aligned to the electronic spin. Since the hyperfine splitting of the electronic ground state is much stronger than dipolar interactions involving the nuclear spin, the latter do not mix different states of the passive qubits. It is advantageous to further require that the doublets of electronic ground and excited states come with different g-factor anisotropy. As one will see in the next subsection, this helps to reduce the single-qubit gate time by allowing for an efficient implementation of nuclear spin flips in the ground state by driving optical transitions via the excited doublet states. Ideally, the g-tensors are both strongly anisotropic, but favoring different magnetization directions. To be precise, let us refer to the main rotation axis of the RE point group as the z-axis, or the longitudinal direction. In many point symmetry groups the g-factor is a diagonal tensor with longitudinal and transverse components, $g_\|$, $g_\perp$. The present scheme requires that the anisotropies, $g_\|$, $g_\perp$, of the two doublets differ. Ideally they differ a lot, e.g. by having $g_\perp \gg g_\|$ in one doublet, but $g_\perp \ll g_\|$ in the other doublet. By far the best gate fidelities are achieved if the doublet of the active qubit is a pure Ising doublet ($g_\perp=0$). Note, however, that vastly different anisotropies are unusual, and that a vanishing perpendicular g-factor requires special symmetries at the RE sites, cf. Sec. "Crystal Symmetry". Nonetheless, as long as the anisotropies of the ground and excited state doublets differ sufficiently, one can carry out fast single-qubit gates, as discussed in the next subsection. This situation is most easily met in Kramers ions (with an odd number of electrons), since non-Kramers ion doublets do not allow for finite values of $g_\perp$, as discussed in Sec. "Crystal Symmetry.

An external magnetic field splits the electronic doublets. It may be helpful to visualize the situation in an extreme case where the ground state has an easy-plane anisotropy, $g_\perp \gg g_\|$, while the excited doublet is of Ising type, having an easy-axis anisotropy, $g_\| \gg g_\perp$. If the field has comparable transverse and longitudinal components, the Zeeman-split eigenstates of the ground state doublet are then mostly polarized in-plane, while the excited doublet splits into eigenstates with a predominantly longitudinal magnetization. The nuclear polarizations of the associated hyperfine states follow the same pattern, as they are coupled antiferromagnetically to the magnetic moment of the electrons. One uses the notation $|\uparrow_n\rangle$, $|\downarrow_n\rangle$ to indicate that the nuclear spin is aligned or anti-aligned with the electronic spin in the excited doublet, respectively, and similarly $|+_n\rangle$, $|-_n\rangle$ for the ground state doublet.

Single-Qubit Gates

Implementation of Single-Qubit Gates

Single-qubit gates for the passive qubit could be implemented by coupling directly to the nuclear spins with microwaves, which drive Rabi oscillations within the pair of hyperfine states that constitute the passive qubit. However, this has the severe drawback that the coupling to the nuclear moment is very weak, which implies very long gate times of the order of $t \sim \hbar/(\mu_N B_{ac})=21$ µs (for an amplitude of the driving field of $B_{ac}=1$ mT. Proposals for qubits based on donors in silicon suffer from this long single-qubit gate time although clock states could be exploited to speed this up Instead one proposes a much faster alternative, which takes advantage of the non-parallel magnetic polarizations in ground and excited electronic doublet states. The latter implies that the nuclear spin is not conserved upon driving transitions between the ground and excited electronic states. Therefore, the passive qubit can be manipulated by driving transitions via the lowest hyperfine state in the excited doublet, merely by coupling to the electronic degrees of freedom. For example, an X-gate, i.e. a logical spin-flip, is achieved with three consecutive laser pulses, as sketched in FIG. 4. In this scheme, the gate time is limited by the inverse of the electronic matrix elements, which are typically much larger than the Zeeman coupling to the nuclear moments.

FIG. 4 shows an implementation of a fast X-gate via an excited state. The blue arrows denote $\pi$-pulses which switch the population of the states they connect. The pulses are applied in the order of the indicated numbers.

The speed-up of this method depends on selection rules, which involve the value of J in the ground and excited doublet states. The biggest speed-up is achieved if magnetic dipole transitions are allowed between the ground and excited J-manifold, i.e. if $\Delta J=0,\pm 1$.

As compared to the direct manipulation of the nuclear spin one achieves a speed-up by a factor of the order of $\mu_B/3\mu_N=600$. The corresponding gate time is of order $t\sim 3\hbar/(\mu_B B_{ac})=35$ ns, for an amplitude of the laser field of $B_{ac}=1$ mT. This single-spin flip is most efficient when the ground state and excited magnetizations are orthogonal to each other, which assures that the nuclear spin feels hyperfine fields with maximally different directions in ground and excited states.

Alternatively to the above protocol, the single-qubit gate could also be implemented using stimulated Raman adiabatic passage. This would have the advantage that the gate fidelity is not affected by the lifetime of the excited auxiliary state, since there is never any sizable population in this state. However, it would come at the price of a longer operation time. Since one anyway requires the excited state to be long-lived enough so as to be able to implement two-qubit gates, there would be no actual advantage to this alternative implementation.

Fidelity of the Single-Qubit Gate

Gate fidelities $\mathcal{F}$ or, equivalently, the gate errors $1-\mathcal{F}$ are important because the inverse of the latter yield an estimate of how many gate operations can be carried out until quantum error correction is required. The minimal gate fidelity is defined as $$\mathcal{F}_{min} = \min_{\psi} |\langle\psi|U_{ideal}^\dagger U_{exp}|\psi\rangle|^2, \qquad (2)$$

where $U_{ideal}$ is the unitary operator of the ideal quantum gate to be implemented, while $U_{exp}$ is its actual implementation.

The gate fidelity is intrinsically limited by $1-\mathcal{F} \gtrsim t_{gate}-t_{life}$ due to the excited state's lifetime $t_{life}$ and the finite single-qubit gate time $t_{gate}$. A further source of gate errors is the population transfer of the addressed qubit to (or from) an undesired HF state on the same qubit. In order to ensure that the single-qubit operations have a high fidelity, the inverse timescale for these processes (the single-qubit Rabi frequency $\Omega$ has to be significantly smaller than the hyperfine splitting of the addressed qubit. For simple square pulses, the error due to 'nearly resonant' states with detuning $\Delta\omega$ is estimated from the theory of Rabi oscillations as $\sim(\Omega/\Delta\omega)^2$. The weak algebraic suppression in $\Omega/\Delta\omega$ is due to the sharp cutoff of a square pulse which entails a broad frequency spectrum. The selectivity of the pulses can be drastically increased (i.e., substantially suppressing errors due to detuned transitions) by choosing smoother pulses such as (cut-off) Gaussian pulses. The error of a single Gaussian $\pi$-pulse is exponentially suppressed for large detuning $\Delta\omega \gg \Omega$ $$1 - \mathcal{F}_\pi \approx \left(\frac{\pi}{2}\right)^2 \exp\left(-\frac{\pi}{2}\left(\frac{\Delta\omega}{\Omega}\right)^2\right), \qquad (3)$$

as follows from first order perturbation theory, cf. Eq. C4 in the Appendix 4. Note that in an experimental setting one needs to optimize the cut-off of the pulse to minimize the pulse duration for a given fidelity, similarly as discussed in the Appendix for the CNOT implementation based on the dipole blockade. From Eq. 3, it follows that for a desired fidelity of a single $\pi$-pulse, $F_\pi$, and a given detuning $\Delta\omega$, the admissible Rabi frequency $\Omega$ is bounded from above by $$\frac{\Omega}{\Delta\omega} \lesssim \sqrt{\frac{\pi}{2\log\left(\frac{\pi^2}{4(1-\mathcal{F}_\pi)}\right)}}. \qquad (4)$$

It follows that for a desired single-pulse fidelity of e.g. $\mathcal{F}_\pi=10^{-6}$ the maximally admissible Rabi frequency is $\Omega/\Delta\omega\approx 0.26\$$. This does not impose a serious restriction on the Rabi pulses. Indeed, for experimental pulses with magnetic field strengths of the order of $B_{ac}\sim 1$ mT the Rabi frequencies are of order $\mu_B B_{ac}/\hbar\sim 90$ MHz, which is much smaller than the HF energy scale $\Delta\omega\sim$GHz. The probably most important source of single-qubit errors in the present scheme is the unintended activation of non-targeted qubits. It can be prevented by a large detuning between nearby ions. This can for example be achieved by locally inducing Stark shifts by electrical gating. Since such detunings are limited to moderate shifts, it is paramount to use selective pulses to minimize the errors on non-targeted qubits, while maintaining a sensible gate speed. The required detunings and electrical fields are discussed in more detail in Sec. "Addressability of selected qubits". Further (negligible) sources of errors are nuclear and electronic spin-flips of nearby passive qubits during an activation pulse, which are discussed in Sec. "passive qubit errors".

Two-Qubit Operations

To achieve universal quantum computing, one needs gates that entangle two qubits. We show here an implementation of a logical CNOT gate. It carries out a spin-flip operation on the target qubit, if and only if the control qubit is in state $|I\rangle$. One can make use of the magnetic dipole interaction between excited electronic states to build a gate between two qubits located at a finite spatial distance. A system of two active qubits is governed by two single-ion Hamiltonians as in Eq. 1, and by the magnetic dipolar interaction between the RE electrons $$H = \sum_{i=1,2} H_{single}^{(i)} + H_{dip} = \sum_{i=1,2} H_{single}^{(i)} \qquad (5)$$
$$+ \frac{\mu_0(\mu_B g_J)^2}{4\pi r_{12}^3} \sum_{\alpha,\beta} \left(\delta_{\alpha,\beta} - \frac{3r_{12,\alpha}r_{12,\beta}}{r_{12}^2}\right) J_\alpha^{(1)} J_\beta^{(2)},$$

where the superscripts (1) and (2) denote the two RE ions and $r_{12,\alpha}(\alpha=x,y,z)$ are the Cartesian components of the spatial vector $\vec{r_{12}}$ connecting the two qubits in the lattice.

In the passive state, due to the applied field, the qubits have a constant magnetic moment (if we neglect the tiny contribution due to the nuclear spin). Since the dipolar interactions between qubits are much weaker than the Zeeman and hyperfine interactions, provided that they are far enough apart in the host medium, one can neglect dipole-induced spin-flip terms. The static dipolar field created by all qubits can thus be taken into account as an effective static field that adds to the externally applied field. However, when a qubit is activated, its dipolar field is replaced by that of the activated qubit. One shows below how this is exploited to entangle two active qubits. The change of the dipolar field also acts on passive qubits. However, one will show in Sec. "passive qubit errors" that this has a negligible dephasing effect.

Implementation of a CNOT Gate

Before carrying out a two-qubit gate operation, one needs to activate the two passive qubits, that is, transfer their quantum information to active qubits. Qubits can be activated by two π-pulses as illustrated in FIG. 3. They simply realize the linear map $$|0\rangle_{pas} \to |0\rangle_{act},$$

$$|1\rangle_{pas} \to |1\rangle_{act}.$$

After having activated two qubits, their dipolar interaction entangles them. Let us assume as in Sec. "Proposed ideal system" that the excited CF doublet has a vanishing transverse g-factor, $g\perp=0$, i.e. vanishing matrix elements of the operators $J_{x/y}$. Upon projecting the dipole interaction between two active qubits onto the subspace of their electronic doublet states, it reduces to an Ising interaction $$H_{dip} \approx \frac{\mu_0 (\mu_B g_{\parallel} \langle \hat{m}\rangle/2)^2}{4\pi r_{12}^3}\left(1 - \frac{3r_{12,z}^2}{r_{12}^2}\right)\sigma_z^{(1)}\sigma_z^{(2)} \quad (7)$$
$$\equiv J_{dip}\sigma_z^{(1)}\sigma_z^{(2)}$$

This neglects higher order terms in the dipolar interaction that arise in a more precise Schrieffer-Wolff transformation that eliminates the other CF states. Those terms are suppressed by at least one factor of $J_{dip}/\Delta_{CF}$, where $\Delta_{CF}$ is the minimal gap between the CF doublet and other CF states.

Note that it is not necessary to restrict to excited doublets with $g\perp=0$ for this approximation to hold, provided that the active qubits of both RE ions are chosen to be en-qubits. Since the Zeeman term is much larger than the hyperfine and dipolar interactions, one can work in a frame aligned with the polarization of the magnetic moment of the electrons, which defines the longitudinal direction. The corrections due to transverse interaction terms are suppressed by at least one factor $J_{dip}/E_Z$, where $E_Z=\mu_B\|\vec{g}\vec{B}\|$ is the electronic Zeeman energy and $\bar{g}$ is the g-tensor of the doublet.

Using the Ising interaction (Eq. 7) in conjunction with single-qubit gates, one can implement a CNOT gate on two active qubits. The Ising interaction entangles the two qubits via the unitary time evolution $$C(\phi) = e^{-i\frac{\phi}{2}\sigma_z^1\sigma_z^2} \quad (8)$$

during an active time window of length $t_\phi=\phi/(2J_{dip})$, and the local unitary operations transform the basis states to achieve the desired CNOT gate. A specific implementation with qubit (1) as the control bit and qubit as the target bit is obtained by combining the following operations (up to a prefactor $$e^{i\frac{\pi}{4}},$$

i.e. an irrelevant global phase of the wavefunction)

$$\text{CNOT}=\sqrt{Z_1}\sqrt{Z_2}^\dagger\sqrt{X_2}C(\pi/2)\sqrt{Y_2}. \quad (9)$$

Here $\sqrt{\alpha_i}(\alpha=X, Y, Z)$ denotes a π/4 rotation of qubit-i around the axis α, i.e.

$$\sqrt{\alpha_i} = e^{-i\frac{\pi}{4}\sigma_\alpha^{(i)}}.$$

However, the full Hamiltonian (Eq. 5) does not only consist of this Ising interaction, but contains additional terms, namely the single-ion Zeeman and hyperfine interactions in Eq. 1 {as well as the two-qubit interactions that are non-Ising}. Even with such terms being present, one can reproduce an effective $C(\phi)$ operation. One finds that for $g\perp=0$ in the excited doublet all terms only have diagonal matrix elements in the relevant 4-dimensional subspace of the active qubits. That is, the effective Hamiltonian takes the general form $$H_{eff}=J_{dip}\sigma_z^{(1)}\sigma_z^{(2)}+h_1\sigma_z^{(1)}+h_2\sigma_z^{(2)}, \quad (10)$$

if one neglects interactions that occur at higher orders in the transverse hyperfine, Zeeman and dipolar interactions, and that pass through states outside the active two-level system. The effective fields $h_1$, $h_2$ result from a combination of the Zeeman and hyperfine terms. They are equal if the active qubit states of both ions are chosen in the same way. The gate errors induced by the non-diagonal terms {due to higher order corrections or due to} finite $g\perp>0$ are discussed in the next subsection.

In order to implement the $C(\phi)$ operation in the presence of non-zero single ion terms $\sim h_{1,2}$, one can use a spin echo to eliminate their effect, namely $$C(\phi = \pi/2) = X_1X_2e^{-\frac{i}{2\hbar}H_{eff}t_{\pi/2}}X_2X_1e^{-\frac{i}{2\hbar}H_{eff}t_{\pi/2}}, \quad (11)$$

with the gate time $t_{\pi/2}=\hbar\pi/(4J_{dip})$. Here, it is assumed that the X-gates are much faster than $t_{\pi/2}$ and thus can be approximated as instantaneous.

After the implementation of the CNOT operation between the active qubits, the quantum information has to be transferred back to the passive qubit. This is done with the same pulses as for the activation in FIG. 3 in reverse order. The full CNOT gate implementation is shown in FIG. 5 as a circuit diagram. The activation is indicated as a SWAP operation between the passive and the active qubit. The single-qubit gates at the beginning and the end are here chosen to act on the active qubit. Alternatively, they could be implemented on the passive qubits. The latter would require more pulses, but would be subject to less noise due to dipolar interactions.

FIG. 5 displays a circuit diagram of the fast implementation of the CNOT gate for two RE qubits. The selective activation and deactivation of qubits—indicated as a SWAP operation—is achieved with electrical gates as discussed in Sec. "Addressability of selected qubits", cf. FIG. 7. Single-qubit gates are implemented with a sequence of pulses as discussed in Sec. "Single-qubit gates" and are assumed to be much faster than the two-qubit operation $C(\pi/2)$.

Fidelity of the CNOT Gate

So far one has neglected the transverse parts of the hyperfine and the dipolar interaction, that is, those terms that flip one or both spins within the excited doublet states. This was motivated by the fact that, if one assumes $g\perp=0$, or in general, if one chooses to use active electro-nuclear-qubits, spin-flip terms appear only in higher order perturbation theory in the transverse terms in Hamiltonian (Eq. 5). However, such transverse perturbations can become important if they connect states that are close in energy. Now it will be discussed how the fidelity of the CNOT gate is affected by such interactions. These considerations will guide us in the choice of the optimal active qubit in a given experimental set-up.

The error due to the off-diagonal matrix elements is quantified by the minimal gate fidelity Eq. 2 and can be estimated as follows. A residual interaction connects two states with energy difference $\Delta$ by a matrix element V, which one assumes to be sufficiently small: For states with mismatch $\Delta$ larger than the inverse gate time $1/t_{gate} \sim J_{dip}$, one assumes the matrix element to be much smaller than $\Delta$, $V \ll \Delta$. Otherwise, it is assumed that $V \ll J_{dip}$. In the latter case, the maximal gate error due to a single residual interaction is estimated as $$\mathcal{F}_{min} \approx \cos^2(Vt_{gate}/\hbar) \approx 1 - \left(\frac{\pi V}{4 J_{dip}}\right)^2. \tag{12}$$

This decrease in fidelity is due to the resonant tunneling between the (nearly) degenerate configurations during the gate time.

On other hand, if a gate error is dominated by a non-resonant process $\Delta \gg J_{dip}$, V, the minimal gate fidelity is approximated as $$\mathcal{F}_{min} \gtrsim 1 - \left(\frac{2V}{\Delta}\right)^2. \tag{13}$$

This error is due to a finite admixing of a non-resonant state, which leads to an incorrect rotation within the qubit space. The decrease in gate fidelity due to any residual interaction, resonant or not, can be summarized as $$1 - \mathcal{F}_{min} \propto \left(\frac{V}{\max(J_{dip}, \Delta)}\right)^2. \tag{14}$$

To optimize the gate fidelity of our CNOT implementation, one has to look at all possible spin-flip processes with the initial state in the active qubit subspace. Here one considers only processes to a final state within the excited electronic doublet space, since processes connecting to other states are detuned by the large CF splitting. Note also, that only spin-flip terms mediated by the dipolar interaction lead to gate errors, whereas single-qubit terms by themselves only lead to a renormalization of the energy levels. In a given experimental set-up, one should then choose the active qubit realization that minimizes the gate error $$1 - \mathcal{F}_{min} \approx \sum_\alpha \left(\frac{V_\alpha}{\max(\Delta_\alpha, J_{dip})}\right)^2 \tag{15}$$
$$\approx \max_\alpha \left(\frac{V_\alpha}{\max(\Delta_\alpha, J_{dip})}\right)^2,$$

where the $\{V_\alpha\}$ are the residual matrix elements and $\Delta$ the corresponding energy mismatches. The latter typically involve the Zeeman energy or the hyperfine coupling and are thus always bigger than the dipolar interaction. The only exceptions are processes that are exactly resonant, $\Delta_\alpha = 0$, and, potentially, those that have a mismatch of order of the nuclear Zeeman energy $E_{Z,n}$.

Figure 6:
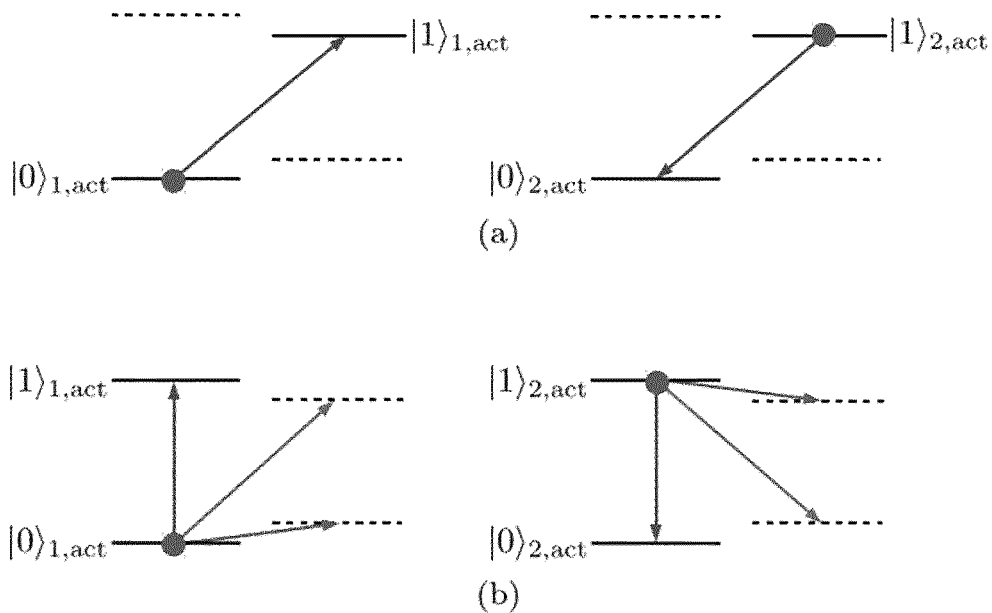
FIG. 6 two possible active qubit choices which are found by minimizing the number of resonant channels and maximizing the lifetime of the active qubits: a) the electronuclear qubit and b) the electronic qubit.

In order to minimize the number of resonant matrix elements, one should realize the active qubits by the same type (e or en) on the two concerned ions, cf. FIG. 6. Indeed, this leaves only one residual resonant process that has an initial state in the two-qubit subspace. The optimal choice, as well as the resulting fidelity depend on whether or not the transverse g-factor of the excited doublet vanishes. One will see that in many cases the electro-nuclear qubit is the best choice. However, for active doublets with $g\perp=0$, the purely electronic qubit may have the best fidelity.

FIG. 6 shows two possible active qubit choices which are found by minimizing the number of resonant channels and maximizing the lifetime of the active qubits: a) the electro-nuclear qubit and b) the electronic qubit. One uses here the same level structure as for the excited doublet in FIG. 3 with the indices 1 and 2 labeling the two ions on which the CNOT gate acts. The red arrows denote the exactly resonant matrix elements which are electro-nuclear and electronic 'spin flip-flops' for (a) and (b), respectively. The blue and green arrows in (b) denote the nuclear and electro-nuclear flip-flops, respectively, which are nearly resonant up to the nuclear Zeeman energy. These processes limit the fidelity of the CNOT gate in the most favorable case of active qubits with $g\perp=0$, for which the electronic qubit (b) minimizes the gate error. In most host materials $g\perp$ is non-zero and the electro-nuclear qubit (a) should be used. It maximizes the gate fidelity since it has the fewest (nearly) resonant error channels.

The active qubits with the best decoherence properties are realized in an excited doublet with $g\perp=0$. In this case there are no residual interactions that act directly within the excited doublet. Any non-Ising matrix elements are thus due to tunneling through intermediate, higher lying CF states. This reduces the magnitude of residual matrix elements and therefore leads to a high fidelity of the present CNOT implementation. The scaling of the matrix elements and therefore the dominant gate errors (assuming the hierarchy of energy scales $J_{dip} \ll A_J \ll E_Z \ll \Delta_{CF}$ can be deduced from perturbation theory for the electro-nuclear (en) and purely electronic (e) qubits as $$en: 1 - \mathcal{F}_{min} \approx \max\left[\left(\frac{J_{dip}}{\Delta_{CF}}\right)^2, \left(\frac{A_J}{\Delta_{CF}}\right)^4\right], \tag{16}$$

-continued $$e: 1 - \mathcal{F}_{min} \approx \max\left[\left(\frac{J_{dip}}{\Delta_{CF}}\right)^2, \left(\frac{A_J}{\Delta_{CF}}\right)^4 \left(\frac{J_{dip}}{\max(J_{dip}, E_{Z,n})}\right)^2\right], \quad (17)$$

where $\Delta_{CF}$ is the gap to the dominant admixed CF state. For strong dipole interactions $J_{dip} > (A_J^2/\Delta_{CF})$, both qubit choices lead to the same gate error. On the other hand, for weaker dipole interactions $J_{dip} > (A_J^2/\Delta_{CF})$, and if in addition $A_J^2/\Delta_{CF} < E_{Z,n}$, the purely electronic qubit is the better choice. For typical values $A_{J/h} \sim$ GHz, $\Delta_{CF}/h \sim 100$ GHz and an applied field of B=1 T, this is the case if the qubits are separated by distances $r \gtrsim 1.2$ nm. The gate error is then limited by the off-resonant nuclear or electro-nuclear 'spin flip-flops', cf. FIG. 6b. It can be estimated to be as small as $1-F_{min} \sim 10^{14}$ for a distance of r=10 nm between the qubits. This intrinsic error is thus negligible, and the fidelity of the present CNOT gate implementation will rather be limited by finite lifetime and decoherence effects.

Let us also briefly comment on the case where the transverse g-factor of the excited doublet is finite, $g\perp > 0$. In this case, the purely electronic active qubit is ruled out, since the transverse part of the dipole interaction mediates a resonant electronic flip-flop process with matrix element $$V \propto \frac{g\perp}{g\parallel} J_{dip},$$

which leads to a substantial gate error $1-\mathcal{F}_{min} = \mathcal{O}((g\perp/g\parallel)^2)$. However, the electro-nuclear qubit is still viable. Assuming a sizable CF splitting, the gate error will be dominated by a process which does not involve higher lying CF states. It scales as $$1 - \mathcal{F}_{min} \approx \max\left[\left(\frac{A_J}{E_Z}\right)^4, \left(\frac{J_{dip}}{A_J}\right)^2\right]. \quad (18)$$

For typical values of the hyperfine interaction and an applied field of B=1 T, the gate error is dominated by the resonant electro-nuclear flip-flop, cf. FIG. 6a, as soon as the qubit spacing exceeds $r \gtrsim 1.3$ nm (assuming $g\perp/g\parallel = \mathcal{F}(1)$). The gate error due to the residual interactions can then be estimated to be $1-F_{min} \sim 10^{-5}$ for a distance of r=10 nm between the qubits. While this is substantially smaller than the intrinsic fidelity for the case $g\perp = 0$, it is still reasonably small. Most likely, it is thus a less limiting factor than the lifetime of the active qubit.

Finally, the finite life or coherence time imposes a lower bound on the typical error, $1-\mathcal{F} \gtrsim (t_{gate}/t_{life})$. Another limiting factor, which one has so far neglected, is the finite activation time of the qubits (as well as the finite time for the spin-echo), leading to $1-\mathcal{F} \gtrsim (t_{act}/t_{gate})^2$. Both $t_{act}$ and $t_{gate}$, and thus both of these lower bounds, can be tuned within some range by the angle of the applied magnetic field. On one hand, the orientation of the field determines the overlap between nuclear spin states in the active and passive qubits and thereby the single-qubit gate time. On the other hand, the field direction also determines the magnetic moment $\mu m$ of the Zeeman split active qubit states, $2\mu_m/\mu_B = \sqrt{(g\parallel\sin(\theta))^2 + (g\perp\cos(\theta))^2}$, and thereby affects the dipolar interaction strength and thus the two-qubit gate time. The orientation of the magnetic field should be chosen such as to minimize the intrinsic errors due to finite activation time and gate time.

A Scalable Quantum Computing Scheme

DiVincenzo Criteria

Let us discuss the present qubit and gate implementations in the light of the DiVincenzo criteria for scalable quantum computing. For a system to qualify as a platform for quantum computing they require:

1. A scalable physical system with well characterized qubits: In the present case the well characterized single RE ions serve as qubits as described in the previous sections. Scalability and the addressability of single qubits will be discussed in the next subsection.
2. Ability to initialize the state of the qubits to a simple fiducial state: Qubits can be initialized in their ground state, $|0\mathcal{F}_{pas}\rangle$, by cooling to a temperature significantly below the gap to the first excited state (the upper state of the passive qubit), which is set by the hyperfine interaction.
3. Long decoherence times as compared to gate times: One achieve long life and decoherence times by working with long-lived passive memory qubits, which are only transferred into active qubit states right before a multi-qubit operation is carried out, cf. Sec. Active and passive qubits.
4. A universal set of quantum gates: Single-qubit gates can be implemented efficiently, as described in Sec. Single-qubit gates. To realize a universal set of quantum gates, one needs only one entangling two-qubit gate. One choses to implement the CNOT gate, cf. Sec. CNOT gate implementation. The present implementation is about two orders of magnitude faster than previously proposed implementations based on the dipole blockade.
5. A qubit-specific measurement capability: In principle, one could measure single RE spins by detecting the emission of a photon after excitation to a high-energy manifold. However, since single-photon measurements have low fidelities, repeated measurements would have to be made; and since the emission process destroys the quantum information, this approach is not viable for our RE qubits. Another way to measure RE spins is suggested: a different RE ion nearby may serve as the readout ion. One then uses the electric (or magnetic) dipole blockade to shift the transition frequencies of the readout ion. If the qubit to be measured is in state $|0\mathcal{F}\rangle$, an external laser excites the readout ion and emission can be detected. The excitation and the emission measurement can be repeated without altering the qubit information (apart from the initial wavefunction collapse which projects onto the eigenstate basis of the qubit), assuming that the excited readout ion decays back to its ground state sufficiently rapidly and that there is no component of its wavefunction that becomes entangled with the qubit ions. Alternatively, we could also perform a CNOT operation analogous to the two-qubit gate, with the qubit as the control bit and the readout ion (in its ground state) as the target bit. This allows for a faster readout than the dipole blockade scheme as discussed below, but it necessitates more control over the readout ion. A further possibility to read out the qubits consists in measuring the RE charge state after an optical excitation. Such single-ion measurements have been demonstrated for example with erbium defects in silicon.

Addressability of Selected Qubits

A key feature of any viable programmable computer, quantum or classical, is the ability to address only the desired (qu)bits during the fundamental one- and two-(qu)bit gate operations, even as one scales up the processor to handle many qubits. The present scheme implements single-qubit manipulations by resonant electro-magnetic pulses. Those should address one and only one qubit at a time. In general, one will spatially separate the qubits and work with dilute magnetic RE ions, using materials in which most RE sites are occupied by non-magnetic RE ions, e.g. trivalent Yttrium. The dilution ensures that the CF levels are those of an isolated ion surrounded by Yttrium, with qubits further away having a negligible symmetry breaking effect on the CF environment. Despite the spatial separation between the qubits, laser pulses cannot be focused below a fraction of their wavelength (although of course near field optical excitation can defeat this limit for samples with a thin, near-surface layer of rare earth impurities), and thus moderate dilution by non-magnetic ions is insufficient to ensure selective addressability of single qubits.

Without operating in the near-field limit, the problem can be overcome by altering the gap between the electronic ground state doublet and the excited state doublet of RE ions locally. If the transition frequencies of the RE ions within the range of a focused laser pulse are shifted by sufficiently different amounts, a single qubit can be addressed by selecting both the focal point and the frequency of the laser. Such a spatial modulation of the transition frequencies has the additional benefit of suppressing the interaction-mediated hopping of an activated qubit state to neighboring RE ions, which would otherwise reduce the life-time of activated qubits.

Addressability by static modulation: If scalability is not an immediate concern, but the aim is merely to selectively address and entangle a few qubits (which is sufficient, e.g., for quantum repeaters), one can achieve a spatially restricted, static modulation of qubit parameters with polarized magnetic adatoms, most easily realized by another species of RE which will be subject to the same (polarizing) external field already imposed on the qubit atoms. Their dipolar magnetic field falls off as $\sim 1/r^3$. For RE ions within a few nanometers from the adatom, the variation of their Zeeman splitting with the distance to the adatom is strong enough to selectively address a few different qubits within that range.

Addressability by dynamic modulation: For a quantum computer, it is more convenient to generate the spatial modulation of transition frequencies dynamically, as needed during a protocol. In order to activate one or a few qubits, one alters the transition frequencies of the targeted RE ions only, so that their gaps are temporarily shifted to be in resonance with the applied laser pulse sequence. In contrast to a static implementation of frequency shifts, such an approach is not limited by the number of qubits that one could address selectively. To achieve the local alteration of RE ion transition frequencies, one proposes to apply local electric fields by local gating. An electric field induces a Stark shift in all CF levels that have electric dipole moments. An array of gates similar to a set-up proposed in the art allows tuning of selected RE ions into resonance with a particular laser resonance line, so as to either activate a qubit or perform selective single qubit operations, as sketched in FIG. 7. The difference in the Stark shift between the targeted RE ion and its neighbors determines the required frequency resolution and thus imposes a bound on the minimal single-qubit gate times.

This dynamic modulation is only possible if the relevant CF states have a non-vanishing electric dipole moment and thus experience a finite Stark shift. As previously mentioned, the present scheme is easiest to implement with Kramers RE ions. Indeed, Kramers doublets have a non-vanishing electric dipole matrix element within their doublet subspace for almost every crystallographic point symmetry group that does not contain the inversion symmetry.

The idea of electrical gating of single RE qubits has previously been discussed in the literature for phosphorous donors in silicon or for Eu ions doped into a $Y_2SiO_5$ matrix. Below one will use the Stark coefficient of $\delta v/\delta \varepsilon = 35$ kHz/(V/cm) measured for Eu-doped $Y_2SiO_5$ to estimate the order of magnitude of the electrical fields required to achieve a desired fidelity of the present scheme.

At a given Stark detuning, the single-qubit gate fidelity increases exponentially as one reduces the Rabi frequency of the activation pulse, assuming that one uses selective Gaussian pulses. However, the associated increase of the activation time decreases the fidelity of two-qubit gates, which is intrinsically limited by the activation time as $1 - \mathcal{F}_{CNOT} \gtrsim (t_{act}/t_{gate})^2$. One needs to optimize these two competing constraints. The single-qubit gate fidelity is most likely limited by the activation error of the N non-targeted qubits which are affected by an activation pulse with a finite spatial focus. For simplicity one assumes the same Stark detuning for all non-targeted qubits. This reduces the gate error of the non-targeted qubits to N times that of a single qubit. It then follows from Eq. 4 that to achieve a desired single-qubit fidelity $\mathcal{F}_{act}$ and two-qubit fidelity, the Stark shift between qubits needs to be larger or equal to $$\Delta \omega \gtrsim \frac{2\sqrt{2}\mu_0\mu_B^2}{\pi^2\hbar r^3} \sqrt{\log\left(\frac{N\pi^2}{4(1-\mathcal{F}_{act})}\right)\frac{1}{1-\mathcal{F}_{CNOT}}}, \quad (19)$$

where one assumed a Gaussian activation pulse cut at $t = \pm \sqrt{\pi}/\Omega_{act}$, with the Rabi frequency $\Omega_{act}$. Let us now estimate the required Stark shifts and electric fields for specific situations. One considers two levels of desired fidelities $\mathcal{F}_{act} = \mathcal{F}_{CNOT} = 99\%$ (a lower bound required for topological error correcting codes) and $\mathcal{F}_{act} = \mathcal{F}_{CNOT} = 99.99\%$. Given a qubit spacing of r=10 nm and a laser spot size of $\sim 1$ µm$^2$ (i.e. $N=10^4$ affected qubits), the Rabi frequency of the activation pulse has to be of order $\Omega_{act} \gtrsim 10$-100 MHz. With the Stark coefficient from Eu doped $Y_2SiO_5$, this requires a difference of electric fields acting on targeted and non-targeted qubits of order $$\Delta \mathcal{E} = \frac{\Delta \omega}{2\pi \partial v/\partial \mathcal{E}} \gtrsim 50 - 600 \frac{V}{cm}.$$

Such field strengths are realistic to achieve in an experimental setting.

To be able to electrically gate any selected qubit, one needs to arrange the qubits in a 2d-array. This can be achieved, e.g., by growing a single layer containing dilute magnetic ions on top of bulk material that contains no RE qubits, and covering it with a thin layer of magnetically inert bulk material. This could be realized, e.g., using liquid phase epitaxy or pulsed laser deposition. Another route is to implant RE ions in silicon, which would allow one to profit from the advanced technology developed for silicon electronics. Single-ion implantation with secondary electron detection for feedback allows the high-fidelity fabrication of 2d-arrays of implanted ions. For methods of RE incorporation with considerable randomness in the positions of the RE atoms, the RE layer in FIG. 7 will need to be surveyed to identify those atoms usable for qubits and quantum gates. Approaches could include superresolution or near field microscopy where one can take advantage of the strong fluorescence of the rare earths. Voltages applied to the gating grids could tune in and tune out the fluorescence response and so locate the RE atoms with respect to the gating grids.

Figure 7:
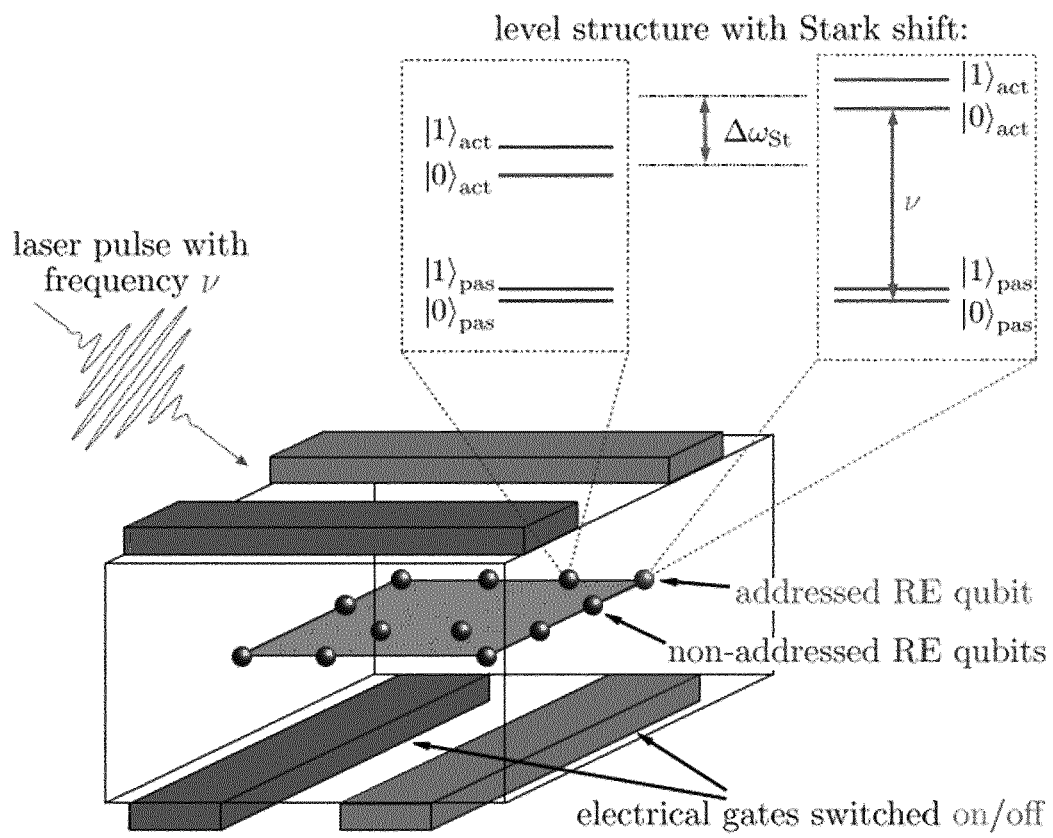
FIG. 7 sketch of the present RE qubit setup with a qubit spacing of order 10 nm.

FIG. 7 shows a sketch of the present RE qubit setup with a qubit spacing of order 10 nm. The qubits are activated with laser pulses. A grid of electrical gates, which can be switched on and off, induces a Stark shift on selected qubits. The difference $\Delta\omega_{St}$ in the Stark shift between neighboring RE ions, which is proportional to the electric field gradient, allows one to address single qubits. Note that the sketch is not true to scale, in particular the thickness of the wires and their distance to the qubits are scaled down to increase readability of the figure.

Robustness of Non-Targeted Passive Qubits During Gate Operations

While the unintended activation of non-targeted qubits can be suppressed with local detunings as discussed above, one also needs to consider the interactions between targeted and non-targeted qubits during (single- and two-qubit) gate operations. These induce errors which cannot be eliminated by the Stark shift above and are therefore intrinsic to our scheme. One argues below that these errors are extremely small and most likely negligible compared to other error sources.

During (de-)activation pulses, one potential source of errors are flips of the electronic or nuclear spins of non-targeted RE ions induced by the time-varying dipolar field of the addressed RE ion. However, the dipolar fields that drive those transitions are much weaker than the fields associated with activation pulses, and thus are a subdominant source of dephasing. In addition to spin-flip errors, the dipolar field during the pulses results in accumulated phases on the surrounding passive qubits. This error is also negligible since the phase amounts to at most $$\delta\phi \sim J_{dip} \frac{\mu_N}{\mu_B} \frac{t_{act}}{\hbar} \sim \frac{\mu_0 \mu_N}{4\pi r^3 B_{ac}} \sim 5 \times 10^{-7}$$

per single-qubit operation for experimental pulses $B_{ac}=1$ mT and a qubit spacing of $r=10$ nm.

These essentially random phases accumulate to an O1 error only after $\sim 1/\delta\phi^2 \sim 10^{12}$ operations. The last error source that one has to consider is due to interactions between active qubits and nearby passive qubits during two-qubit gates where the targeted RE ions stay activated for an extended period. These interactions can be described in terms of a dipolar field that depends on the active qubit's state and acts on the passive qubits. The field can be decomposed into components parallel and transverse to the existing average local field on the passive qubit. The effect of the longitudinal part cancels out once a spin-echo (within the active qubit) is applied, as is indeed the case for our CNOT scheme. However, the transverse part of the field induces a second order correction to the level splitting, which does not reverse under the spin-echo. This results in a deterministic phase accumulation in the passive qubits. The (distance-dependent) phase factor $\delta\phi$ for nearby ions is of order $$\delta\phi \sim A_J \left(\frac{J_{dip}}{E_Z}\right)^2 t_{gate} \sim \frac{A_J J_{dip}}{(\mu_B B)^2} \sim 10^{-8}$$

(with $r=10$ nm, $B=1$ T) and can theoretically be taken into account when multi-qubit operations are carried out. However, it is most likely negligible compared to other error sources. The considerations above show the robustness of the passive qubits during gate operations in our proposed scheme.

Comparison to Similar Schemes

Comparison to CNOT implementation via dipole blockade Let us now compare our scheme to alternative implementations of CNOT gates with dipole-coupled RE ions. Prior art proposed to use the so-called dipole blockade. Here the qubits consist either of two electronic CF states or of two hyperfine levels of a single electronic level. An auxiliary state to which one qubit state can be excited, is used as well. All these states interact via their magnetic or electronic dipole moments. As discussed in Sec. Active and passive qubits, for RE ions, magnetic and electric dipolar interactions are usually of similar strength, since the electric dipole moments are typically very small, while typical magnetic moments are fairly large.

The dipole blockade works as follows: If the control qubit is in the $|0\rangle$ state it is transferred to an excited state with different dipole moment. Through its dipolar interaction with the target qubit, the level structure of the latter is changed. Now a sequence of three pulses, whose frequencies match the unmodified level structure of the target qubit, is applied. This swaps the states $|0\rangle$ and $|1\rangle$ of the target qubit, but only if the control qubit was left in the state $|1\rangle$, since the pulse sequence is off-resonant if the control qubit was excited, cf. FIG. 8. After this conditional swap, the control qubit is brought back to its initial state.

Figure 8:
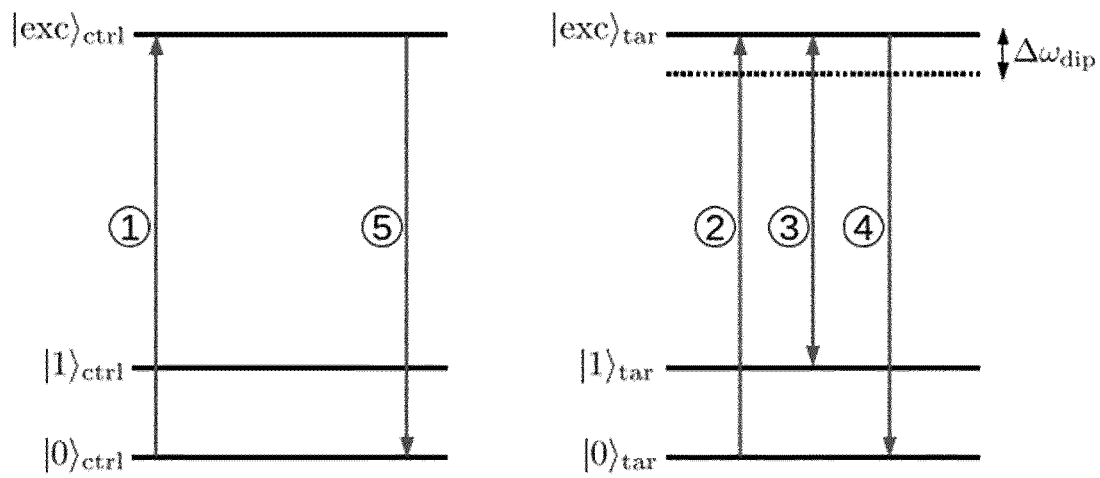
FIG. 8 schematically a pulse sequence for the dipole blockade scheme.

FIG. 8 schematically shows a pulse sequence for the dipole blockade scheme. If the control qubit is in state $|0\rangle$, it is excited, which shifts the levels of the target qubit out of resonance with the swapping pulses. A swap is thus only carried out if the control qubit was in state $|1\rangle$. The indices 'ctrl' and 'tar' denote the control and target qubit, respectively.

Such a dipole blockade could also be implemented with the present magnetic states, and it is thus interesting to compare it to the proposed scheme. It turns out that the present CNOT implementation is significantly faster because it makes use of the full interaction strength between two RE ions, achieving a gate time equal to $t_{gate}=\hbar\pi/(4J_{dip})$. The dipole blockade instead relies on the ability to resolve the frequency shift induced by the dipole interaction. This requires Rabi frequencies smaller than the interaction strength and consequently gate times that are substantially longer than in the present scheme. The gate time is determined by minimizing the $\pi$-pulse duration. This is carried out by numerical evaluation of the unitary time-evolution in the rotating-wave approximation and optimizing with respect to both the pulse cut-off $T_{cut}$ and Gaussian pulse width T, such that for all detunings larger than $\Delta\omega_{dip}$ the gate error is below a threshold value 1–F. Like for the present direct gate, the gate time of the dipole blockade is proportional to $1/\Delta\omega_{dip}$, but in addition, it grows logarithmically with the desired gate fidelity, cf.\FIG. 9. Therefore, if one requires gate errors to be less than $10^{-4}$, the indirect dipole blockade is roughly a factor of 50 slower than the present gate.

Figure 9:
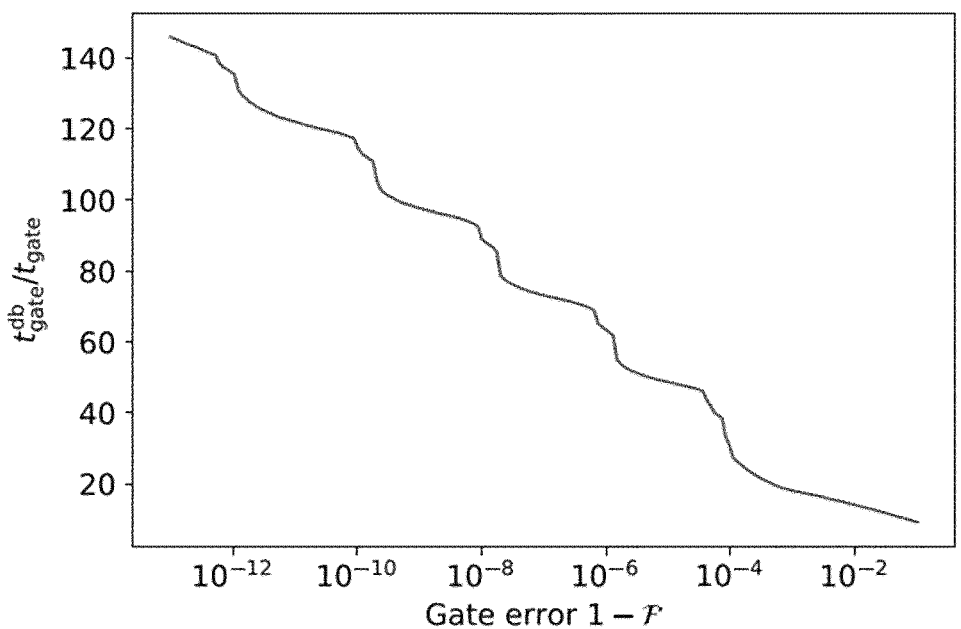
FIG. 9 the speed-up factor by which the gate time of the present CNOT implementation is reduced as compared to that of a dipole blockade scheme carried out with Gaussian pulses.

The result of the optimization in FIG. 9 shows that the minimal gate time required in the dipole blockade increases monotonically with the required fidelity, but does so in an oscillatory manner. This originates from Rabi-like oscillations of the (unwanted) transition probability, which in turn results from the non-adiabatic switching-on and -off of the pulses at $t=\pm T_{cut}$. Viewing the fidelity as a function of the $\pi$-pulse duration $T_\pi=2 T_{cut}$, the local maxima of the fidelity are spaced by $\Delta T_\pi=4\pi\Delta\omega_{dip}$.

FIG. 9 shows the speed-up factor $t_{gate}^{db}/t_{gate}$ by which the gate time of the present CNOT implementation is reduced as compared to that of a dipole blockade scheme carried out with Gaussian pulses. The speed-up increases logarithmically with the maximally admissible gate error $1-F$. The oscillatory behavior traces back to Rabi oscillations in the unwanted transition probability. One assumes the same strength of dipolar coupling in both schemes.

Comparison to Implementation with Phosphorous Donors in Silicon

The present scheme resembles in several aspects the scheme originally proposed for phosphorus donors in the prior art, where the nuclear spins of $^{31}P^+$ are used to store quantum information. In contrast to the present scheme, the donors have no electronic spin. Instead they are tunnel-coupled to single-electron transistor structures. By gating those, an extra electron is loaded into a spin-down state onto the donor. This operation is the equivalent of the present gate-tuning the RE qubits by a local Stark shift, which singles out the qubits which are later selectively addressed. In the prior art proposal, resonant microwave pulses then transfer the stored quantum information from the nuclear spins to the electronic states. This is the analog of the activation step of the present e-qubits. Two active qubits interact by dipolar interactions, and the CNOT gate is realized in the same way as discussed herein.

However, the present scheme has several advantages:

(i) The magnetic moment of (effective) RE spins are much larger (typically by a factor 5-7) than the ones of single electrons. This allows for a much shorter two-qubit gate time, as it is inversely proportional to the square of the magnetic moment which enters into the dipole interaction.

(ii) The present single-qubit gate time is up to a factor ~600 faster since one can make use of the hyperfine interaction and manipulate the nuclear spin states via electronic transitions instead of coupling electromagnetic pulses directly to the nuclear spins.

(iii) The qubit activation in the present scheme is simpler and does not involve a charge transfer (with associated dipole moments and lattice excitations) over interatomic distances. This is likely to reduce the activation error. The drawback of the implementation is that the electron mediated interaction between passive qubits is not completely switched off, but only suppressed. The lifetime of the passive qubits is therefore limited by excitation hopping. In the case where $g\perp=0$ in the GS doublet, which is least favorable to hopping, it yields a life time $$T_1 \sim \frac{\hbar}{J_{dip}}\left(\frac{\Delta_{CF}}{A_J}\right)^2.$$

However, since this corresponds to a very small energy scale of a few Hz, the hopping can be suppressed by internal inhomogeneities or externally applied gradients, which strongly reduces the effect of resonant hoppings.

VII. Considerations for Experimental Realization

A. Requirements on the Crystal Symmetry

The present scheme relies on the existence of magnetic doublet states with different magnetic anisotropy within the same CF environment. This enables fast single-qubit operations and qubit activation/deactivation processes. It has been also shown that $g\perp=0$ in the excited doublet is a desirable (but not necessary) property since it significantly enhances the intrinsic fidelity of the present CNOT gate implementation. Furthermore $g\perp=0$ in the ground state leads to the longest lifetime of the passive qubit states. These requirements impose constraints on the point symmetry group of the RE ion.

Kramers ions: For Kramers ions, (at least) doubly-degenerate states are ensured by time-reversal symmetry whose longitudinal g-factor g|| is generally non-vanishing independent of crystal symmetry. Furthermore, due to time-reversal symmetry, CF doublets that contain wavefunctions of the J manifold with $J_z$ eigenvalues $|m_z=\pm 1/2\mathcal{F}$ always have a finite transverse g-factor $g\perp\neq 0$. Thus, doublets with different anisotropy directions are expected for Kramers ions independent of the crystal symmetry. This does not hold for the cubic point groups, where the g-factors are isotropic.

Thus, cubic symmetries are not suitable for this scheme. In Table I, one indicates which point symmetry groups also allow for doublets having $g\perp=0$, and which ones allow for Stark shifts of the doublets, enabling the electrical gating of qubits.

Kramers ions will always have some doublets with non-vanishing $g\perp\neq 0$, irrespective of the point group. Here one tabulates the possibility that also doublets with $g\perp=0$ occur in the various crystallographic point groups. Point symmetry groups with Kramers doublets that also allow for electric dipole moments are highlighted in bold.

| Crystal structure | symmetry group | doublets with $g\perp=0$ |
|---|---|---|
| Triclinic | $C_1, S_2$ | no |
| Monoclinic | $C_2, C_S, C_{2h}$ | no |
| Orthorombic | $D_2, C_{2v}, D_{2h}$ | no |
| Tetragonal | $C_4, S_4, C_{4h}$ | yes (J = 3/2) |
| | $D_4, C_{4v}, D_{2d}, D_{4h}$ | |
| Trigonal | $C_3, S_6$ | yes (J > 1/2) |
| | $D_3, C_{3v}, D_{3d}$ | |
| Hexagonal | $C_6, C_{3h}, C_{6h}$ | yes (J > 1/2) |
| | $D_6, C_{6v}, D_{3h}, D_{6h}$ | |
| Cubic | $T, T_h$ | no |
| | $T_d, O, O_h$ | no |

Non-Kramers ions: Non-Kramers ions can host magnetic (degenerate) CF states only if the point symmetry group of the RE ion has irreducible representations that are higher-dimensional or complex. This is the case for the tetragonal, trigonal, hexagonal, and cubic point symmetry groups. However, all these non-Kramers doublets are of Ising type, having vanishing perpendicular g-factors. Only the triplets of the cubic groups allow for matrix elements of the transverse magnetization operator between degenerate states with the g-factor being isotropic. Unfortunately, these cubic groups are also not suitable for the present scheme, since the doublets they host do not possess magnetic moments, i.e. $g\|=g\perp=0$ Case Study of $LiYF_4$ To illustrate the present scheme and the main ideas of this document, one discusses a specific RE material: $^{167}$Er-doped $LiYF_4$. It possesses an $S_4$ symmetry at the RE sites, $Er^{3+}$ being a Kramers ion. The absence of inversion symmetry in this symmetry group allows for electrical gating of the qubits. One has chosen Er-doped $LiYF_4$ just as an example to illustrate the scheme, while it is not the optimal candidate material as one will see below.

The ground state manifold has angular momentum $J_{GS}=15/2$, with anisotropic g-factors of the Kramers doublet $g\|^{(0)}=3.147$ and $g\perp^{(0)}=8.105$. Each doublet state splits into an octuplet of hyperfine states upon coupling to the nuclear spin $I=7/2$. The passive qubit is encoded in the two states of lowest energy, i.e. with nuclear spin projection $-7/2$ and $-5/2$, respectively, with respect to the polarization axis of the electronic ground state. The hyperfine interaction strength is $A_{15/2}/h=-125$ MHz and the nuclear g-factor is $g_N=-0.16$. Since the hyperfine interaction is relatively small, the system needs to be cooled through a cold finger or via dynamic means below $T\approx A_{15/2}/\kappa_B g\perp/(2gL)=20$ mK to be prepared in its ground state.

The first excited J-manifold has total angular momentum $J_{exc}=13/2$ at an energy of $\Delta_e/h=196$ THz. Its lowest state is a doublet with g-factors $g\|^{(1)}=1.37$ and $g\perp^{(1)}=7.45$, respectively. The hyperfine constant for this manifold is $A_{13/2}/h=-147$ MHz. Since the transverse g-factor does not vanish, the active qubit must be chosen to be an electronuclear qubit. More specifically, one choose the active qubit to consist of the lowest and second highest hyperfine level of the excited doublet, i.e. the states with nuclear spin projection $-7/2$ and $-5/2$ with respect to the polarization axis of the excited doublet, cf. FIG. 10.

Figure 10:
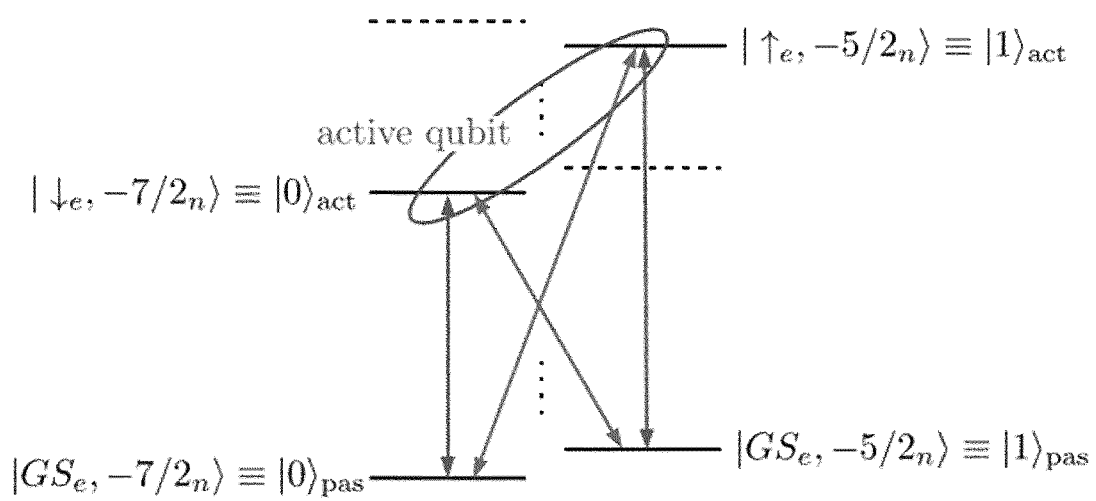
FIG. 10 shows a sketch of the present choice of passive and active qubits in $LiYF_4:^{167}Er^{3+}$.

FIG. 10 shows a sketch of the present choice of passive and active qubits in $LiYF_4:^{167}Er^{3+}$. The nuclear spin states denote the projections in the electronic polarization directions, i.e. they are not the same for the ground state and excited doublet. Due to the similar g-factor anisotropies in the ground and excited doublet, the transitions indicated with blue arrows are considerably faster than the transitions indicated with green arrows.

A moderate magnetic field of $B\gtrsim 0.3$ T suffices to achieve the energy scales needed for this scheme to work $(B\gg IA_e/\mu_B=30$ mT. The direction of the externally applied magnetic field is, however, still a parameter which allows tuning of the single-and two-qubit gate times as discussed in Sec. CNOT gate fidelity. One should choose the magnetic field angle such as to optimize the two-qubit gate fidelity. It turns out that this fidelity is not limited by the off-diagonal terms of the hyperfine interaction, but rather by the following two factors:
  (i) the finite coherence time of the excited states $t_{coh}\sim100$ μs, as measured in $LiYF_4$ doped with $^{166}$Er (which has no nuclear spin, as opposed to $^{167}$Er);
  (ii) the finite activation and single-qubit gate time of the qubits. Due to the similar anisotropies of the g-factors in the ground and excited doublet, the activation of the qubits (i.e. the transition $|0/1\mathcal{F}_{pas}\leftrightarrows|1/0\mathcal{F}_{act}$ is considerably faster than the application of an X-gate on the active qubits, which involves the slow transitions $|0/1\mathcal{F}_{pas}\leftrightarrows|1/0\mathcal{F}_{act}$, cf. FIG. 10. To maximize the gate fidelity it is therefore better to deactivate one of the two qubits while applying an X-gate (for the spin echo) on the other active qubit, and vice versa.

One now estimates the total gate time and CNOT fidelity by taking into account the finite activation and X-gate times. For simplicity one neglects all single-qubit gates in the scheme except for the spin echo, cf. FIG. 5 and Eq. 9, which implements the two-qubit operation $C(\pi/2)$. The activation times are estimated with the oscillator strength of the transition between the two doublets f=1.54, which corresponds to an electric transition dipole moment of $\mu_e=4.3*10^{-32}$ Cm. Assuming pulses with magnetic field amplitudes $B_{ac}=1$ mT, one finds with this an optimal angle of the magnetic field from the xy-plane of $\theta=60.0°$ for a qubit spacing of r=10 nm, leading to an extrinsic gate fidelity of the CNOT implementation of $F_{min}\approx95.7\%$ and a total gate time of 4.5 μs.

Almost needlessly to say, $F_{min}$ is far below what is required for any realistic quantum processor; $LiYF_4:Er^{3+}$ was chosen here because it is a well-characterized system which is simple to evaluate in the context of the proposed scheme. To improve the gate fidelity, faster single-qubit gates and/or better decoherence times are needed. The former requires more anisotropic g-factors, i.e. different doublets or a different material. To improve the decoherence time, one should decouple the electronic spins from the surrounding nuclear spins sitting on other (non-RE) atoms. This can be achieved via dynamical decoupling and/or by choosing a host-material where the non-RE ions have smaller or even vanishing magnetic moments. Good host systems to explore are isotopically enriched silicon, or orthosilicates where decoherence times of up to 4.4 ms have been measured, which would lead to a gate fidelity of $F_{min}\approx99.9\%$, assuming all other numerical factors to be the same as above.

VIII. Conclusion

In this document, one has proposed an implementation of qubits using RE ions subject to a crystal field and hyperfine coupling. The present scheme provides a promising platform for universal quantum computing. One uses nearly decoupled passive (memory) qubits and transfer them to less protected active qubits only when they are involved in a two qubit gate. The passive qubits are well-protected nuclear spin states serving as quantum memory. The active qubit states are magnetized electronic states that can interact over relatively long distances.

The level scheme of a single ion (illustrated in FIG. 2) has the following essential ingredients:
  (i) a Zeeman-split magnetic ground state;
  (ii) a nuclear spin and strong hyperfine interactions;
  (iii) a doublet state at the bottom of an excited J-manifold, having a magnetic anisotropy differing from that of the ground state. The last requirement is easiest to meet with Kramers RE ions. The highest two-qubit gate fidelities are achieved by excited doublet states with $g\perp=0$. Using a crystal where the RE site has one of the point group symmetries highlighted in Table I allows for electrical gating of the qubits and thereby assures that individual qubits can be addressed selectively. As a concrete example and illustration of the inventive scheme, one has discussed the case of Er-doped $LiYF_4$.

The scheme proposed here equally applies to molecular magnets and crystals hosting transition metal ions, as long as they generate a CF level structure that matches the above three criteria. Given the possibilities offered by isotope enrichment and semiconductor processing, one believes the most promising materials platform to be silicon doped with RE ions.

Using the above ingredients, it is possible to implement a CNOT gate using the Ising-like dipole interaction between two active qubits. This achieves a speed-up by up to two orders of magnitude as compared to the standard dipole blockade.

A decisive advantage of the inventive scheme as compared to many others lies in the fact that the selective activation and the slow power law decay of the dipole interaction allows gates between relatively distant qubits, even if many non-activated qubits are located between the two qubits that are being coupled. In contrast to similar schemes which also use nuclear spins as passive qubits, one can reach a speed-up for single-qubit gates by a factor of order 600. This is achieved by coupling to electronic instead of nuclear matrix elements which is possible due to different g-factors in the ground state and the excited doublets. Furthermore, the use of the effective spin of a RE shell (as opposed to spins of single electrons as in phosphorous doped silicon) allows for larger magnetic moments of several $\mu_B$. At equal distances of qubits, the dipolar interaction is enhanced by the square of the larger magnetic moment and the two-qubit gate time is accordingly reduced by an order of magnitude. Thus, the present invention discloses the implementation of RE qubits with coupled electro-nuclear degrees of freedom and fast single-qubit and CNOT gates that can entangle not only nearest neighbors, but also relatively distant qubits in an array. Combined with the readout capability of single ions and the possibility of coupling RE ions to optical modes, networks of such ions are appropriate for scalable quantum computing.

The invention claimed is:

1. A universal quantum computing system using electro-nuclear wavefunctions of rare-earth ions, the computing system comprising:
   a) a 2D-matrix of rare-earth ions embedded in an insulating solid state matrix;
   b) each of the rare-earth ions representing a nuclear qubit to be selectively operated as a passive qubit or as an active qubit;
   c) the passive qubit being represented by a passive electronic doublet at a non-degenerate ground state, thereby storing quantum information in the two different nuclear spin states that are possible in the non-degenerate ground state, causing two different passive-state electro-nuclear wavefunctions; and
   d) the active qubit being represented by an active electronic doublet at a non-degenerate excited state, thereby storing the quantum information in the two different nuclear spin states that are possible in the non-degenerate excited state, causing two different active-state electro-nuclear wavefunctions; and
   e) a laser source for selectively generating laser pulses in order to optically excite the rare-earth ions from the non-degenerate ground state into the non-degenerate excited state and vice versa, thereby locally controlling an electronic dipolar interaction in a tunable manner among at least two active qubits; and
   f) an external electric field in form of switchable electric gates for inducing a Stark shift for a selectable qubit; and
   g) an external magnetic field.

2. The system according to claim 1, wherein the 2D-matrix is realized by growing a single layer containing dilute magnetic rare-earth (RE) ions on top of a bulk material that contains no RE qubits and covering the layer with a thin layer of magnetically inert bulk material or by a single ion implantation of the RE ions in bulk silicon.

3. The system according to claim 1, wherein the 2D-matrix is a $LiYF_4$ bulk material that is doped with $^{167}Er^{3+}$ ions.

* * * * *